(12) United States Patent
Rydberg

(10) Patent No.: US 6,901,642 B2
(45) Date of Patent: Jun. 7, 2005

(54) CUTTING TOOL, INSERT HOLDER AND MACHINING METHOD

(75) Inventor: Christer Rydberg, Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/370,616

(22) Filed: Feb. 24, 2003

(65) Prior Publication Data

US 2003/0167613 A1 Sep. 11, 2003

(30) Foreign Application Priority Data

Feb. 22, 2002 (SE) .............................................. 0200560

(51) Int. Cl.[7] .............................................. B23P 23/02
(52) U.S. Cl. ........................ 29/27 C; 29/558; 407/133; 407/99; 407/102
(58) Field of Search ............................... 29/27 C, 558, 29/566, 50, 33 J; 409/65, 66, 71, 74, 131, 132; 407/33, 34, 40, 47, 48, 51, 66, 102, 103, 104, 99, 31, 55, 61, 67; 82/121; 408/203.5, 22, 24, 26, 28, 221, 223, 224

(56) References Cited

U.S. PATENT DOCUMENTS

| | | | | |
|---|---|---|---|---|
| 3,759,625 A | * | 9/1973 | Iversen ........................ 408/227 |
| 3,899,813 A | * | 8/1975 | Lovendahl .................... 407/44 |
| 4,281,947 A | * | 8/1981 | Marlowe ..................... 408/1 R |
| 4,603,463 A | * | 8/1986 | Wolbert et al. ............... 29/557 |
| 4,640,159 A | | 2/1987 | Stojanovski | |
| 4,834,597 A | | 5/1989 | Andersson et al. | |
| 4,934,883 A | | 6/1990 | Andersson et al. | |
| 4,968,192 A | * | 11/1990 | Hamilton ..................... 408/204 |
| 4,993,891 A | * | 2/1991 | Kaminiski et al. ............ 407/51 |
| 5,026,224 A | | 6/1991 | Andersson et al. | |
| 5,733,075 A | * | 3/1998 | Basteck ....................... 408/57 |
| 5,911,548 A | * | 6/1999 | Deiss et al. ................. 409/234 |
| 6,132,146 A | | 10/2000 | Satran et al. | |
| 6,138,540 A | | 10/2000 | Niemi | |
| 6,142,716 A | | 11/2000 | Jordberg et al. | |
| 6,616,387 B2 | * | 9/2003 | Schneider et al. .......... 408/224 |

FOREIGN PATENT DOCUMENTS

| | | |
|---|---|---|
| DE | 37 33 298 | 4/1989 |
| DE | 198 57 841 | 6/2000 |
| EP | 1 166 930 | 1/2002 |
| GB | 2 122 124 | 1/1984 |
| WO | 01/00362 | 1/2001 |

\* cited by examiner

*Primary Examiner*—A. L. Wellington
*Assistant Examiner*—Dana Ross
(74) *Attorney, Agent, or Firm*—Burns, Doane, Swecker & Mathis, L.L.P.

(57) ABSTRACT

A cutting tool includes a holder and at lest two first cutting inserts. The holder has a number of insert pockets in order to receive those cutting inserts. The cutting inserts are mounted in the holder such that their radially outermost portions lie substantially in an imaginary circle. The circle constitutes an effective diameter of the cutting tool. The cutting tool, in addition, includes at least one second cutting insert provided for a machining operation different from that of the first cutting inserts. The second cutting insert is spaced radially inwardly from the circle.

18 Claims, 12 Drawing Sheets

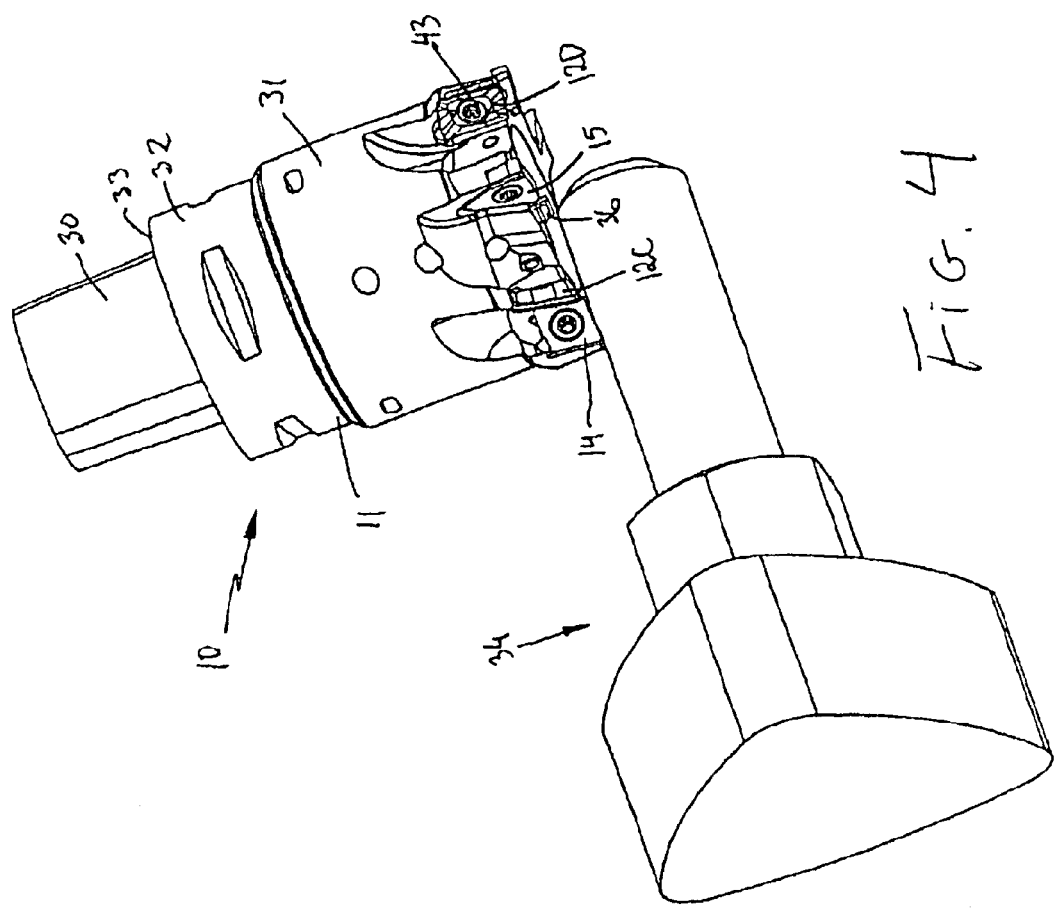

CUTTING TOOL, INSERT HOLDER AND MACHINING METHOD

This application claims priority under 35 U.S.C. §119 Patent Application Ser. No. 0200560-1 filed in Sweden on Feb. 22, 2002, the entire content of which is hereby incorporated by reference.

FIELD OF THE INVENTION

The present invention relates to a cutting tool and a holder for chip removing machining, and to a method of machining a work piece.

BACKGROUND OF THE INVENTION

All numerical controlled (NC) lathes are equipped with different tools for the various machining operations and require either that a new tool be indexed forwardly in the tool revolver or be collected from a tool magazine connected to the lathe. The time for tool change varies greatly depending on the size of the machine, but lies as rule between 1 and 10 seconds. The cutting of complicated details with short times of machining and at high number of revolutions, causes many tools to be used and the unproductive time of the machine becomes long. For some jobs, values of more than 50% are mentioned regarding unproductive time.

Machine development has brought about the provision of a milling spindle to the modern NC lath in the x direction but which in principle can move freely in the working area and can reach the work piece from all directions in machines with multi-functions with a so called B spindle. The problem lies nowadays in that tools are not optimized for use in the new machines.

British Patent 2,122,124 shows a cutting tool provided with a shank connected to a head. The head carries three axially directed cutting edges, which are indexed to the active position as the preceding cutting edge becomes worn out.

OBJECTS OF THE INVENTION

One object of the present invention is to provide a cutting tool and a holder for metal machining that overcome the above-captioned drawbacks.

One object of the present invention is to provide a cutting tool that can replace a number of conventional tools.

Still another object of the present invention is to provide a stable holder.

A further object is to provide an efficient machining method.

SUMMARY OF THE INVENTION

One aspect of the present invention relates to a cutting tool for chip removing machining. The tool comprises a holder which defines a center axis and has a plurality of insert pockets formed therein. At least two first cutting inserts are mounted in respective ones of the pockets and are configured for performing a first type of machining operation, wherein radially outermost portions of the first cutting inserts lie substantially on an imaginary circle. At least one second cutting insert is mounted on the holder and configured for performing a second type of machining operation which is different from the first type. The at least one second cutting insert is spaced radially inwardly from the imaginary circle.

Another aspect of the invention relates to a holder of a chip removing machining tool. The holder comprises a body which defines a center axis and has a plurality of first insert pockets positioned such that radially outermost portions of the first insert pockets lie on an imaginary circle. The body also includes at least one second pocket spaced radially inside of the imaginary circle.

Another aspect of the invention relates to a holder for a chip removing machining tool which comprises a body having a center axis and a through-hole formed therethrough along the center axis. The through-hole defines an inner periphery of the holder. A first plurality of insert pockets is formed in an outer periphery of the holder, and a second plurality of insert pockets is formed in the inner periphery of the holder.

Yet another aspect of the invention relates to a method of machining a workpiece which comprises the steps of:

A) positioning, adjacent the workpiece, a cutting tool comprising a holder which defines a center axis and carries a plurality of first cutting inserts and at least one second cutting insert, the first cutting inserts configured differently from the at least one second cutting insert;

B) performing a first chip forming machining operation on the workpiece by the first cutting inserts, while the at least one second cutting insert remains passive; and C) performing a different chip forming machining operation on the workpiece by the at least one second cutting insert while the first cutting inserts remained passive.

DESCRIPTION OF THE DRAWINGS

These objects and advantages of the invention will be evident from the following detailed description of preferred embodiments of a cutting tool and a holder according to the present invention in connection with the appended figures, wherein:

FIG. 4 shows the cutting tool in a side view during longitudinal turning of the work piece.

DESCRIPTION OF PREFERRED EMBODIMENTS OF THE INVENTION

Figure 1A:
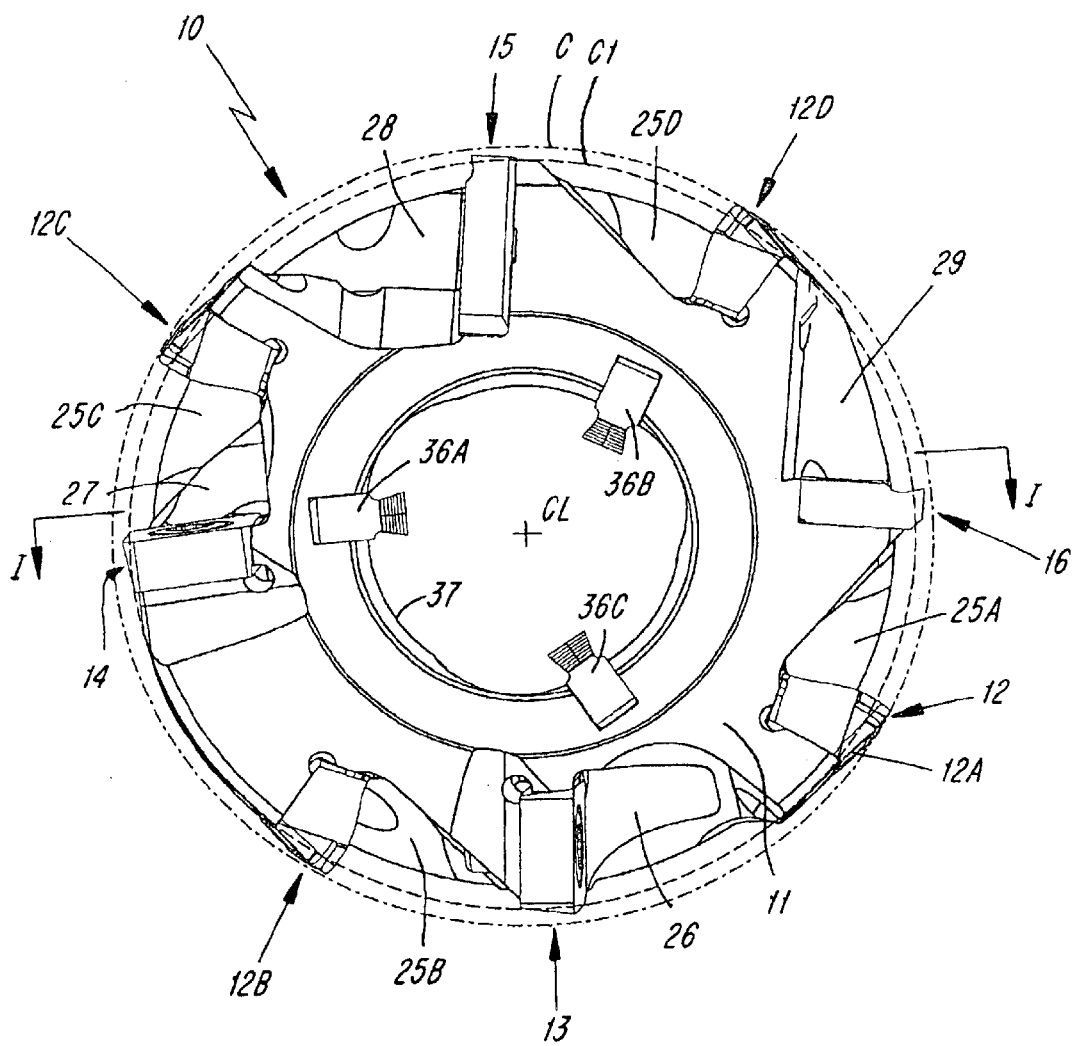
FIG. 1A shows an embodiment of a cutting tool according to the present invention, in a bottom view.
Figure 1B:
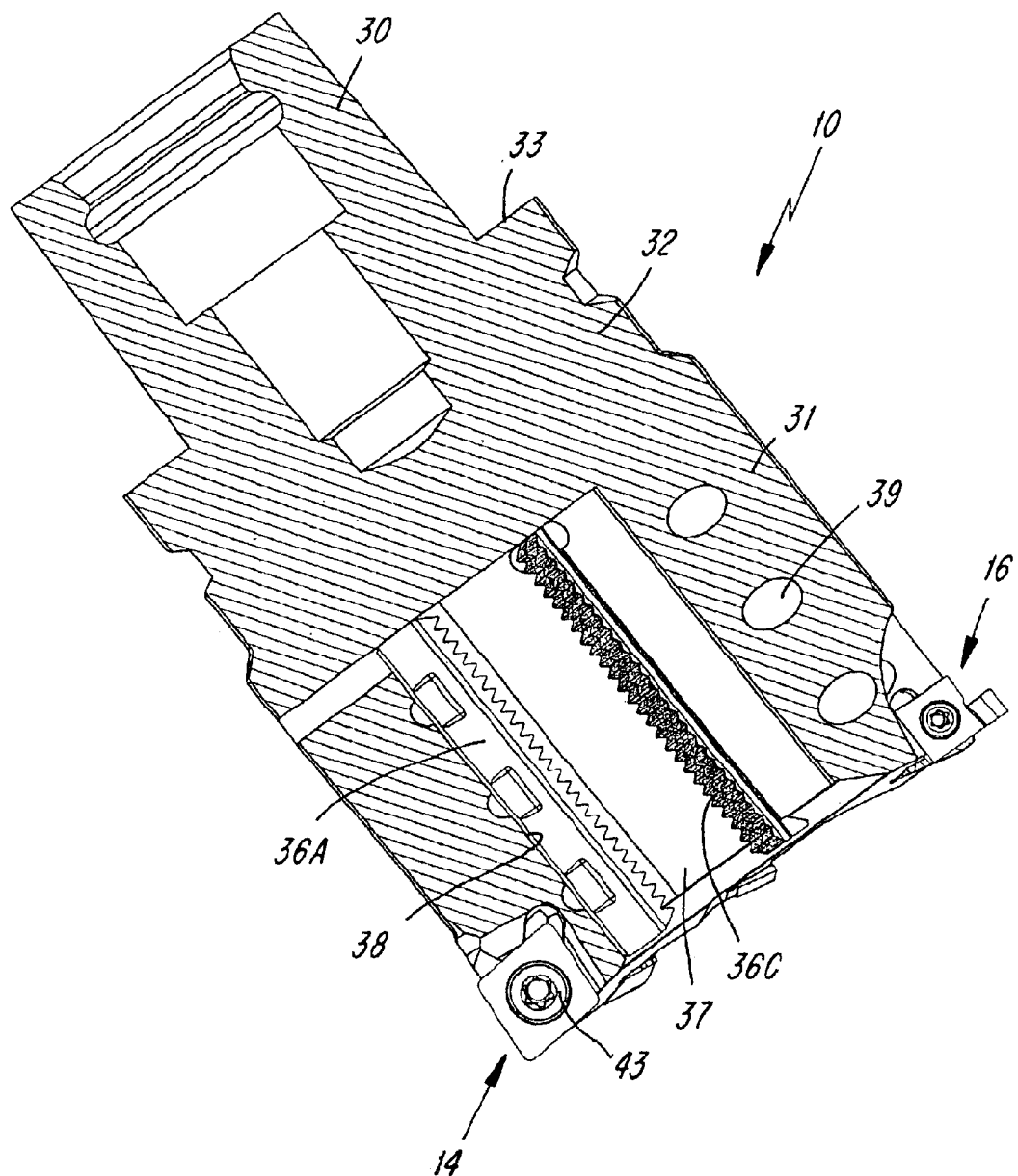
FIG. 1B shows the cutting tool in a cross-section according to the line I—I in FIG. 1A.
Figure 1C:
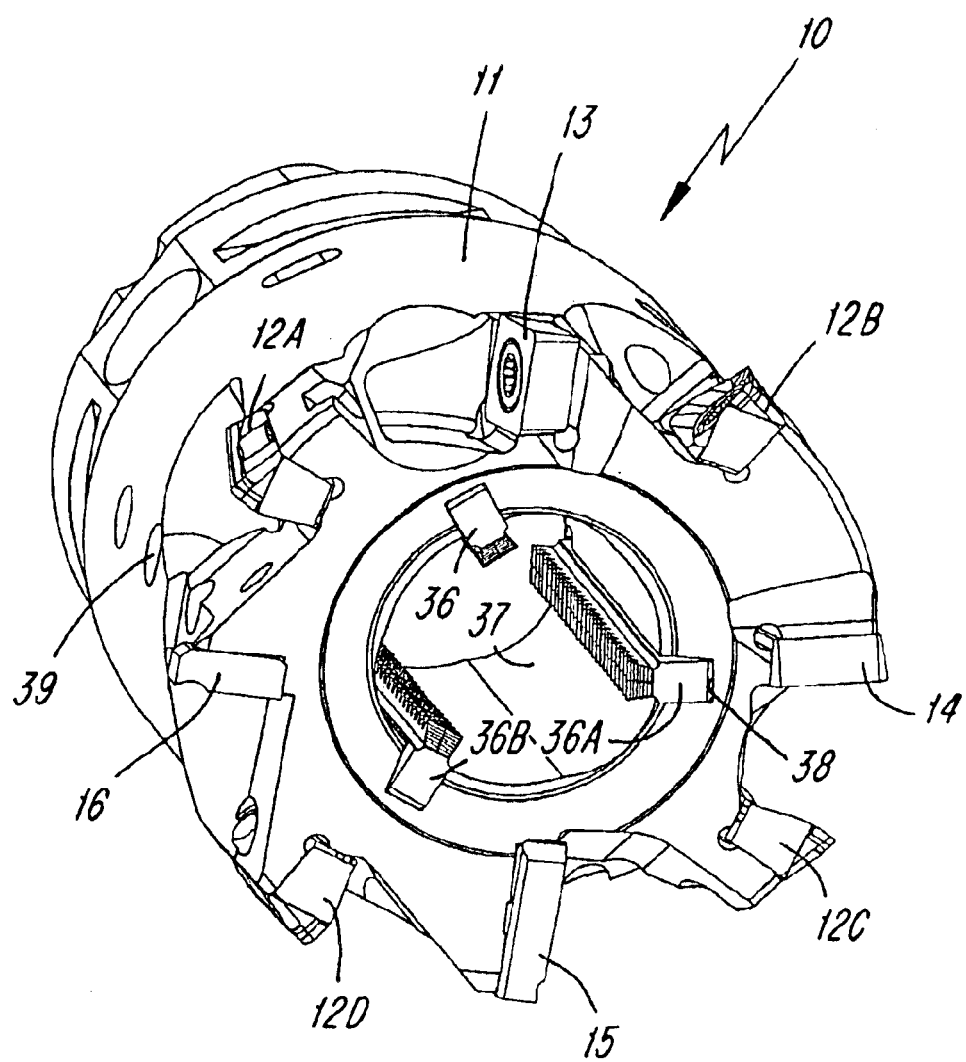
FIG. 1C shows the cutting tool in a perspective view.

In FIGS. 1A–7 is shown a cutting tool 10 according to the present invention developed in the basic shape of a milling tool. The cutting tool 10 comprises a rigid tool body or holder 11, preferably formed of steel, and a number of cutting inserts 12, 13, 14, 15, 16 and 36, 36A, 36B, preferably formed of sintered cemented carbide. The tool body 11 comprises a number of insert pockets 17, 18, 19, 20, 21 and 38 formed in a front end surface of the holder 11 in order to receive the cutting inserts 12–16 36, 36A and 36B. Each cutting insert pocket 17–21 and 38 is forwardly oven and adapted to a geometry of a cutting insert and comprises a primarily planar base surface 22 and at least one shoulder 23, 24 (FIG. 5B). The cutting inserts 12–16 and 36 in the cutting tool 10 such as illustrated in FIGS. 1–7 are intended for: Milling (i.e., the cutting inserts 12A–12D), turning (i.e., the cutting inserts 13 and 14), threading (i.e., the cutting insert 15), grooving (i.e., the cutting insert 16) and thread milling (i.e., the cutting inserts 36, 36A, 36B). The object of the cutting tool 10 in a modern machine is to be able to machine a work piece 34 substantially in one set-up to get a finished component. It is also possible to connect drilling edges to an alternative cutting tool or to provide other cutting edges around an inner periphery defined by a central hole 37 in the cutting tool for the external machining of rods.

The shoulder or shoulders 23, 24 are intended to abut against an edge surface or against each edge surface of the cutting insert. A through-going, preferably threaded, boring is provided in the holder in order to receive a fastening screw 43 in order to fix the cutting insert in the holder 11 in a known manner. Alternatively, one or more cutting inserts can be mounted on one or more cassettes which are fixed to the holder.

The holder 11 consequently comprises a number of first insert pockets 17A, 17B, 17C and 17D in order to receive four first, milling, inserts 12A, 12B, 12C and 12D, respectively. The insert pockets are provided in the holder 11 such that the most peripheral parts of the pockets in relation to the center axis CL of the holder (i.e., the radially outermost parts) substantially lie on an imaginary circle C1 (FIG. 1). The circle C1 constitutes the biggest or effective diameter of the holder 11.

The holder 11 furthermore comprises at least one second insert pocket, but preferably a plurality thereof 18–21 and 38 to receive second cutting inserts for performing a type machining other than that of the first cutting inserts. The second insert pockets 18–21 and 38 are spaced radially inwardly from the circle C1.

The number of first insert pockets 17A–17D for the milling inserts 12A—12A is preferably between four and ten. A chip space 25A, 25B, 25C, 25D is provided in connection with each cutting insert pocket for the milling inserts. The second insert pockets 18–21 are each intended to receive one turning insert 13–16. A chip space 26, 27, 28 and 29 is provided in connection with each cutting insert pocket for the turning inserts 18–21. At least one of the first insert pockets 17C and one of the second insert pockets 19 connect to a common chip space 25C, 27 in the holder. That is, a front surface of a cutting insert 12C faces a front surface of a cutting insert 14, so that chips cut by the cutting insert 12C during a milling operation, and by the cutting insert 14 during a turning operation use the same space 25C, 27 for chip removal from the machining area.

The holder 11 comprises a fastening means with a shank 30 which connects to a head 31 via an intermediate portion 32. The intermediate portion has a planar end surface 33 from the central part of which the shank 30 projects. The shank is of triangular shape (see FIG. 2A), and the feature of the fastening means is more closely described in U.S. Pat. Nos. 4,834,597; 4,934,883; and 5,026,224, which hereby are incorporated by reference in the present description. The fastening means is also known as "Coromant Capto®". The shank 30 has an axial length L1, and the intermediate portion 32 and the head 31 (excluding cutting inserts) together have a length L2 (see FIG. 2C). The length L2 is preferably from 1.5–3 times the length L1, in order to obtain a very rigid tool, which is a prerequisite for obtaining exact tolerances especially during turning operations. The fastening means may alternatively be of another type such as a cylindrical shank, an ISO cone, a Morse cone or similar.

The milling inserts 12A–12D are described more closely in U.S. Pat. No. 6,142,716 which hereby is incorporated by reference in the present description. Each milling insert 12A–12D comprises two, substantially parallel, longer sides joined by short sides, and also includes upper and lower sides through which the screw 43 extends. At least one cutting edge pair is formed at the transition between the upper side on one hand and both a long side and a short side on the other hand. The upper side constitutes a rake face, and each of the long side and the short side constitutes a clearance surface. Each cutting edge pair comprises a major cutting edge at the long side, and a minor cutting edge at the short side, which edges meet at the area of a cutting corner. The cutting corner is provided inside of an imaginary extension line of the major part of the short side. The minor cutting edge is provided to generate the surface of the work piece 34 in a milling operation. The main cutting edge slopes such that it forms an acute angle with the lower side. Each cutting edge pair connects in a direction towards the lower side to a first clearance surface that protrudes relative to the plane in which the major part of the short and long sides lie.

Figure 2A:
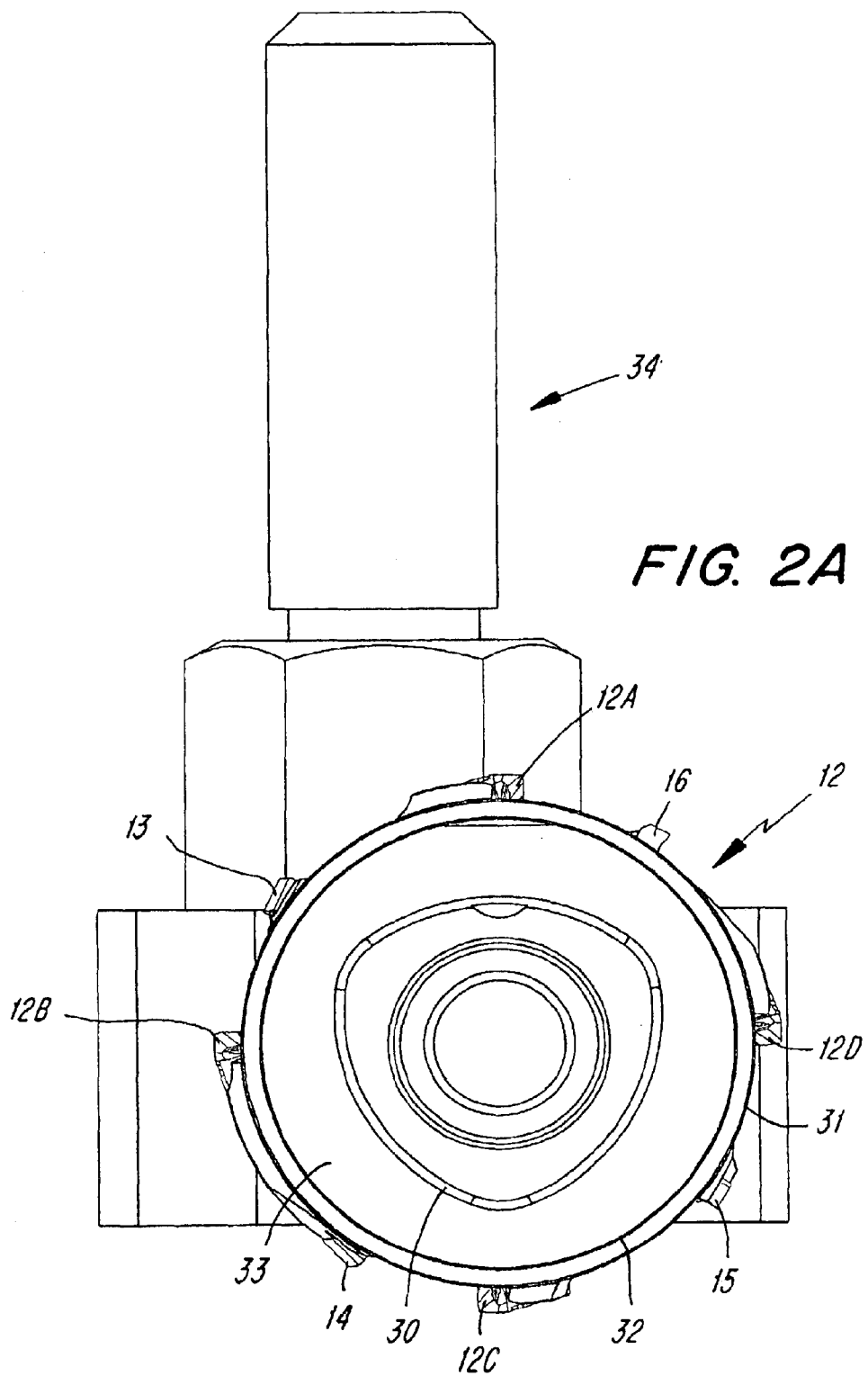
FIGS. 2A–2C show the cutting tool in a top view, in a perspective view and in a side view, respectively, during round milling of a work piece.
Figure 2B:
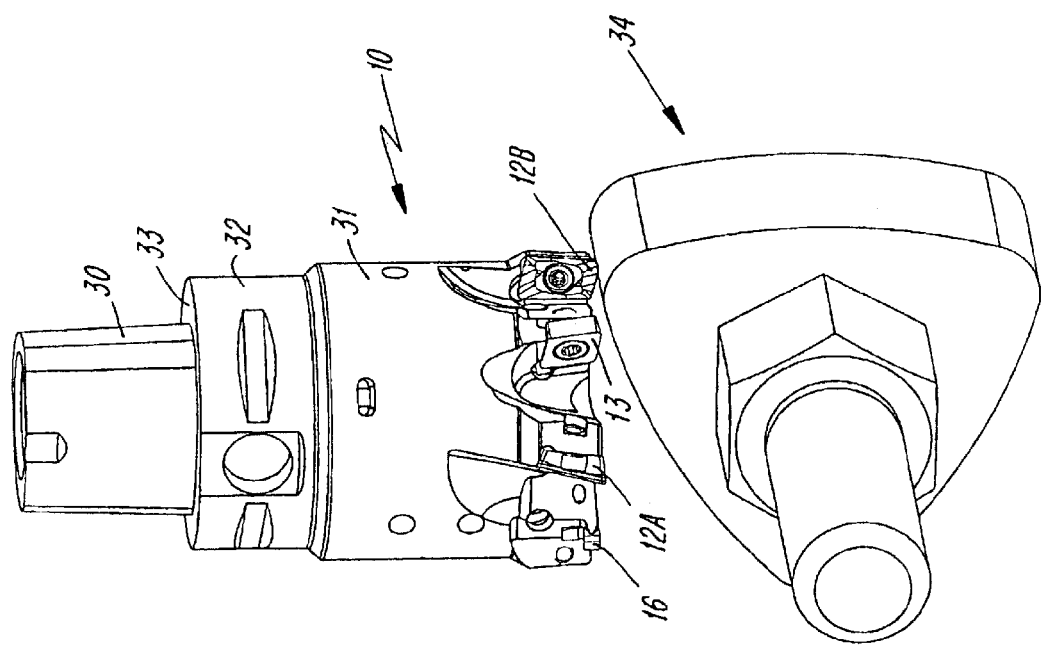
Figure 2C:
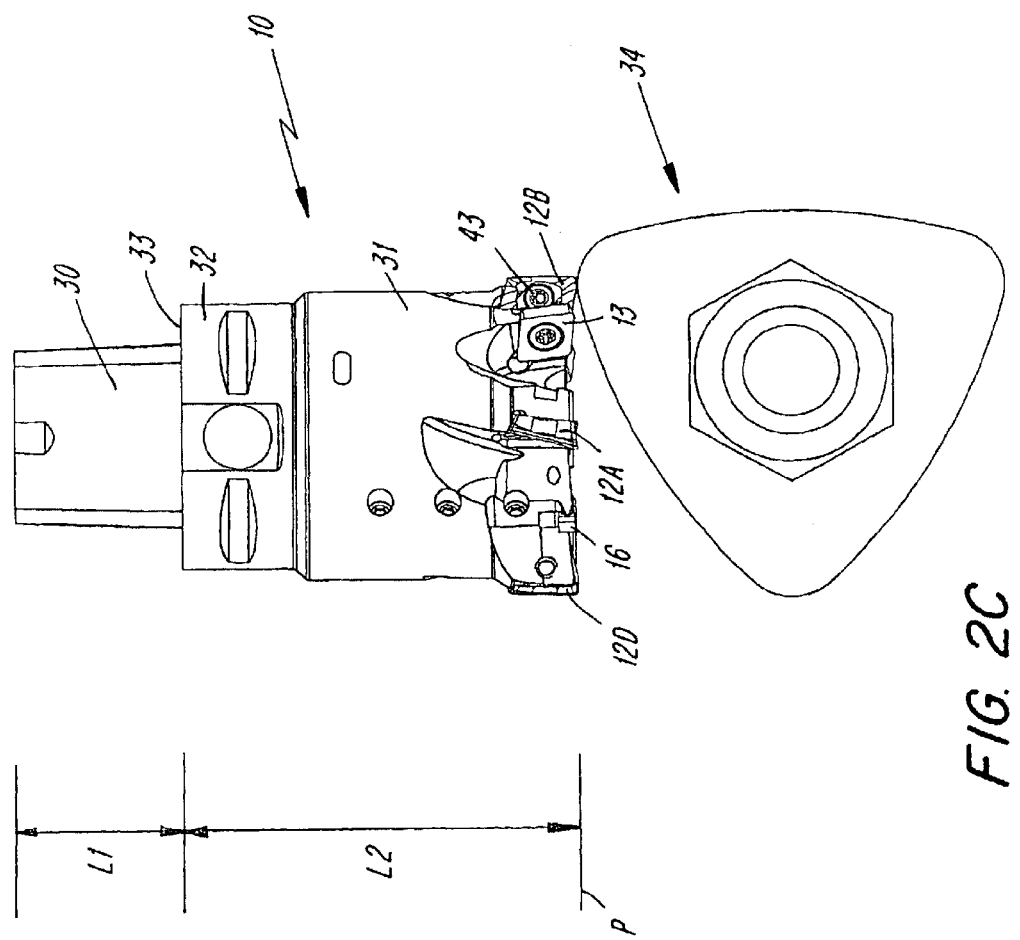
Figure 3:
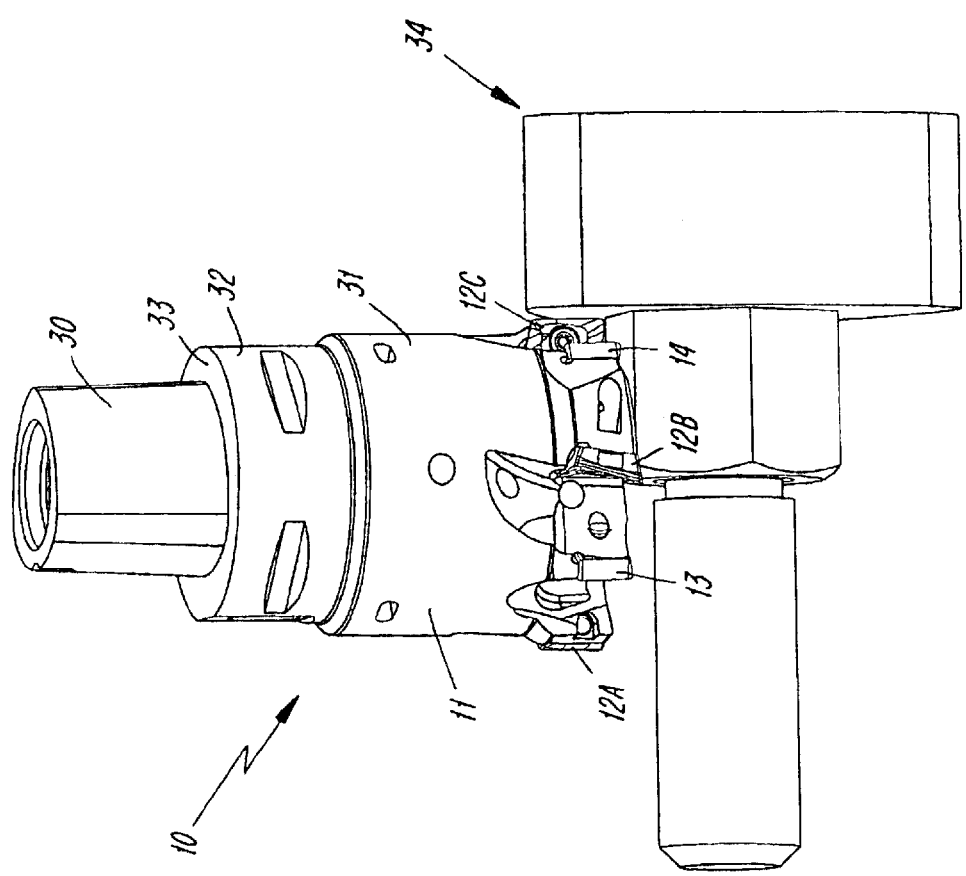
FIG. 3 shows the cutting tool in a perspective view during corner milling of the work piece.
Figure 5A:
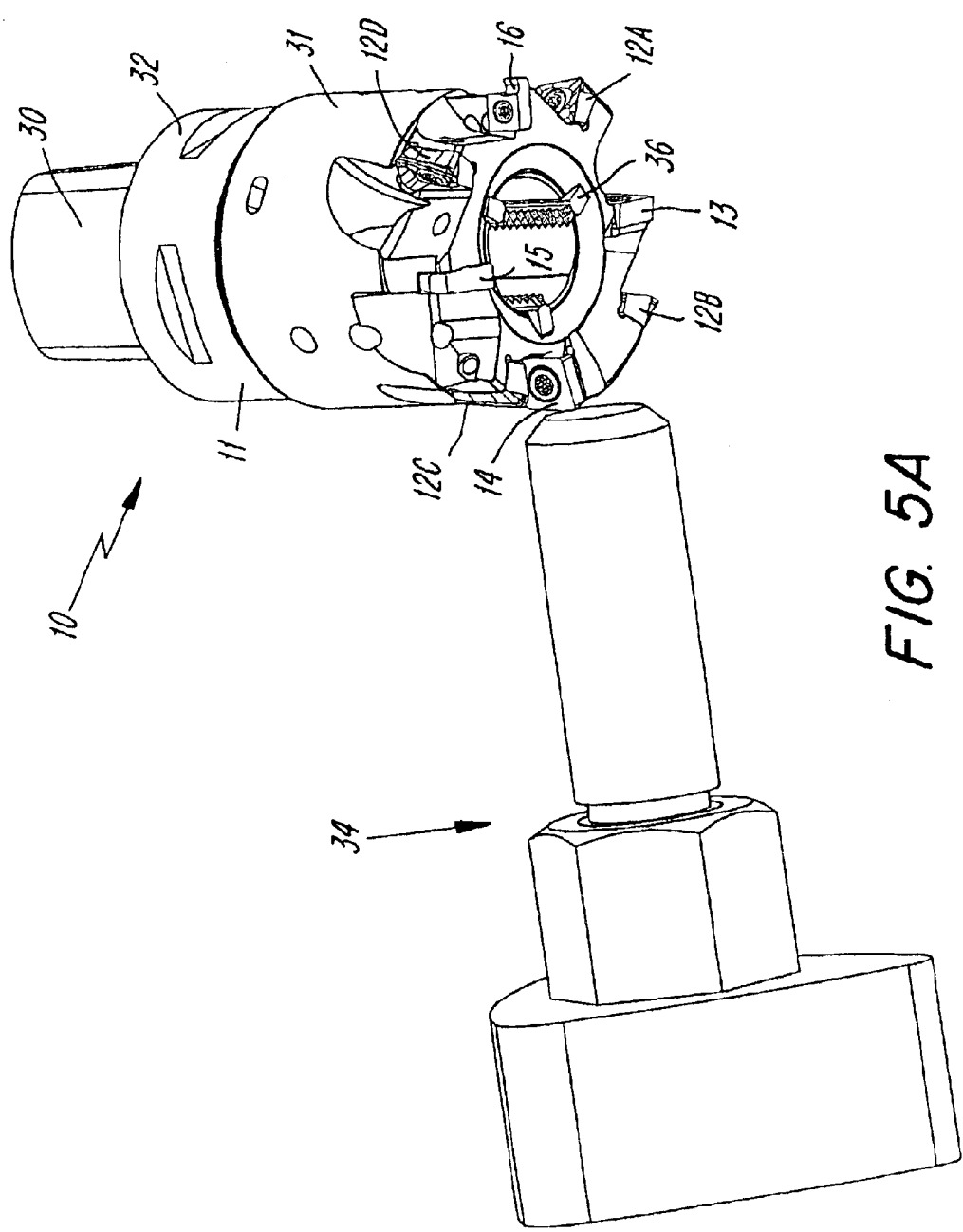
FIG. 5A shows the cutting tool in a perspective view during facing of the work piece.
Figure 5B:
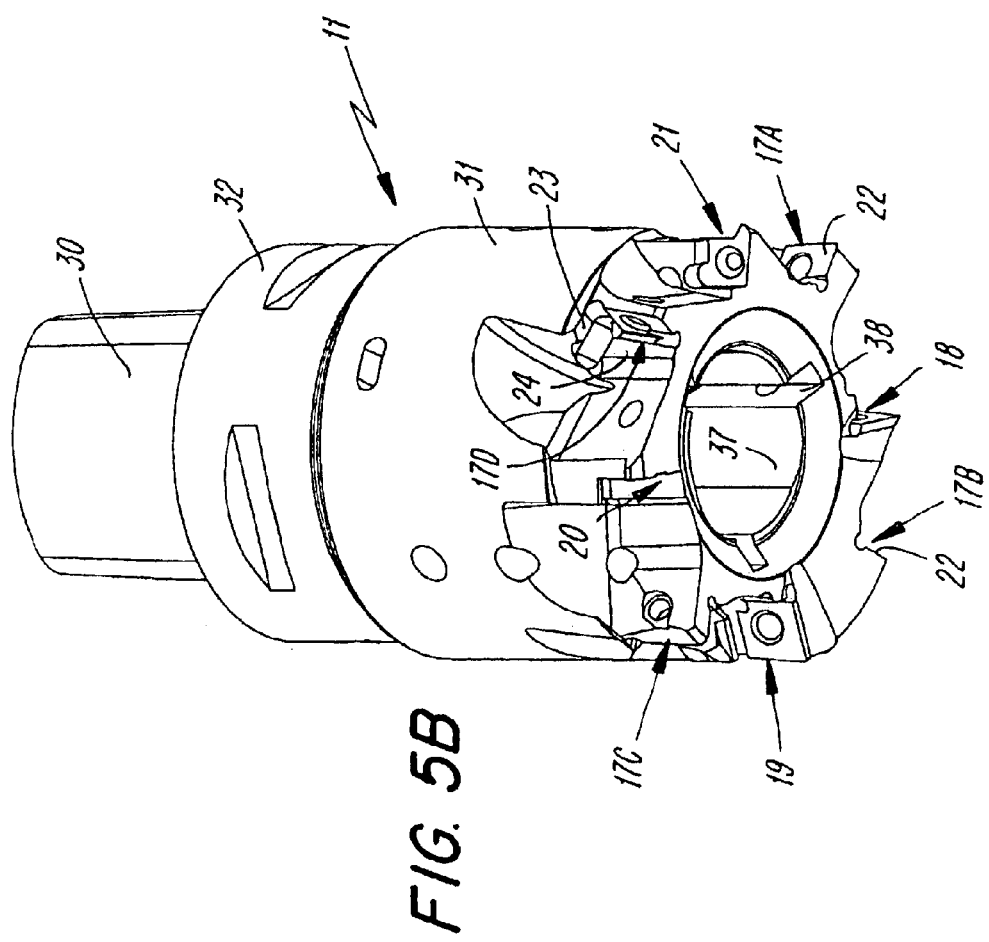
FIG. 5B shows a holder according to the present invention in the same perspective view as in FIG. 5A.

It is understood that the milling inserts and associated insert pockets could have other geometries. The milling inserts 12A–12D are disposed in the holder 11 such that their most peripheral parts relative to the center axis CL of the holder, i.e., the radially outermost portions thereof, lie substantially in a circle C. The imaginary circle C also constitutes the biggest or effective diameter of the cutting tool 10. The axially foremost parts of the milling inserts 12A–12D lie in a plane P (FIG. 2C).

The second cutting inserts 13–16, for turning operations, are spaced radially inwardly from the circle C. The most peripheral parts (i.e., radially outermost portions) of the second cutting inserts 13–16 are preferably provided radially outside of the biggest or effective diameter C1 of the holder. The turning inserts 13–16 are provided also axially inside the plane P. That means that also the insert pockets for the turning inserts preferably lie axially inside of a plane oriented parallel with the plane P.

Figure 6:
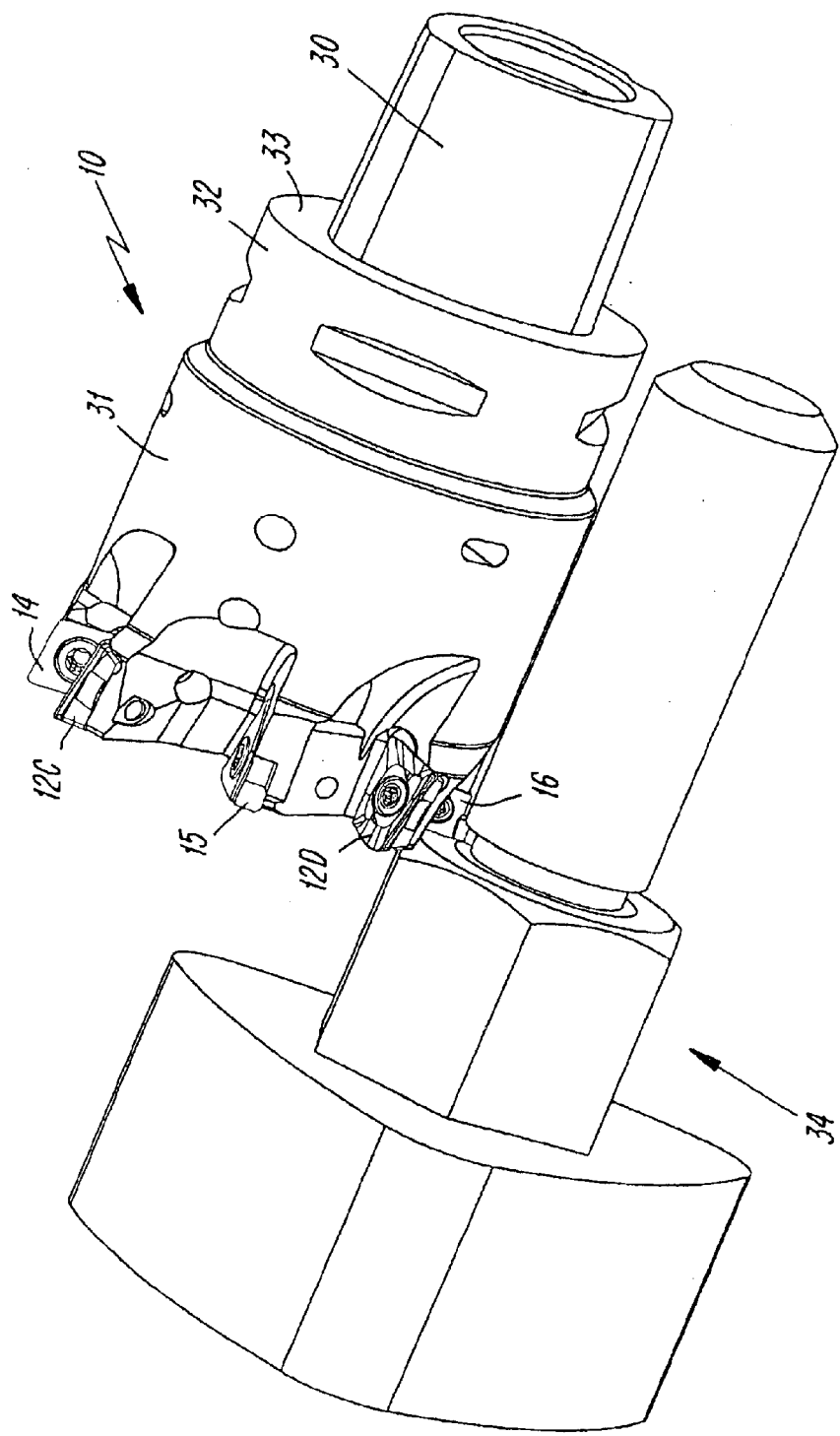
FIG. 6 shows the cutting tool in a perspective view during grooving of the work piece.
Figure 7:
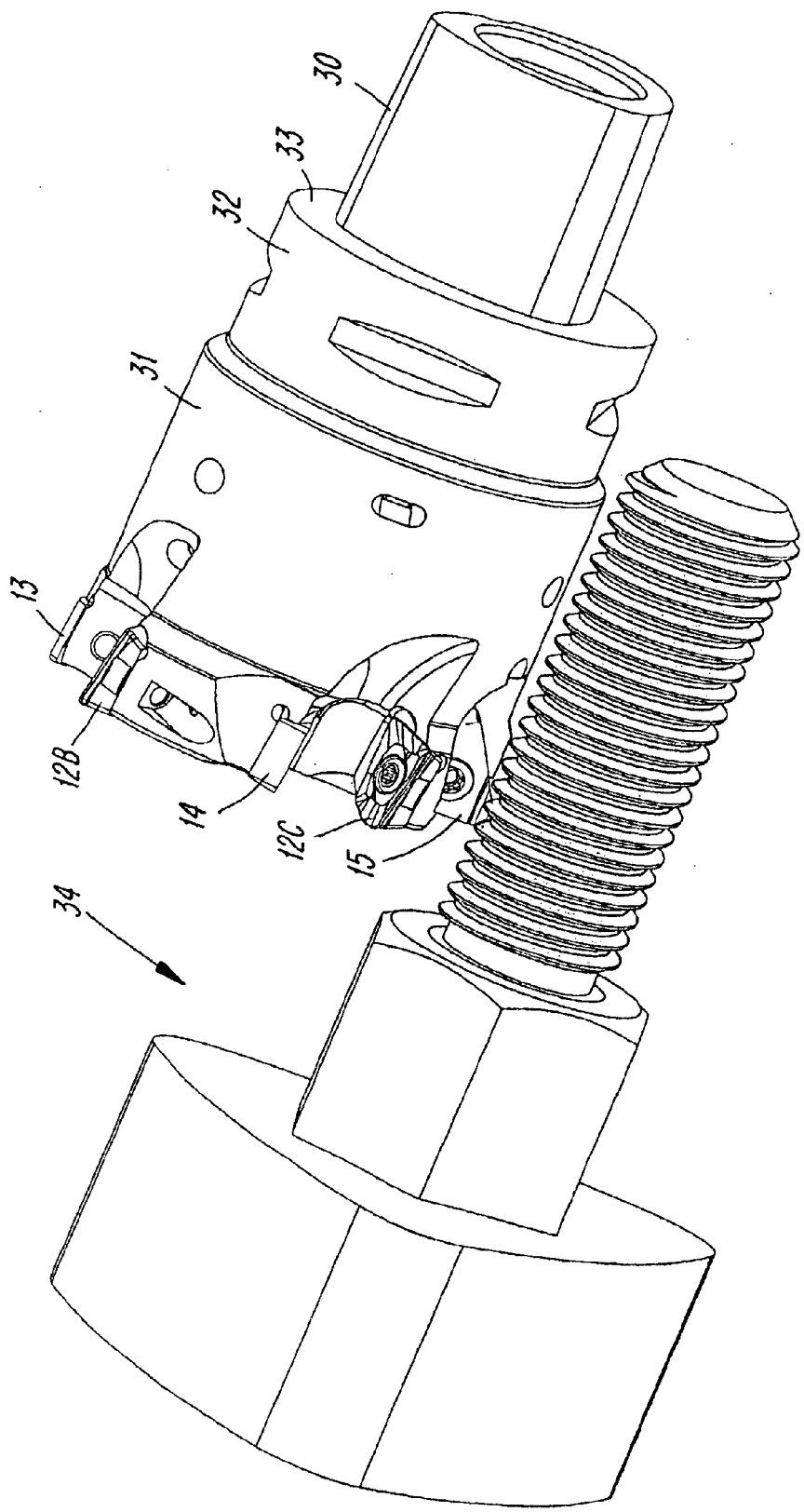
FIG. 7 shows the cutting tool in a perspective view during threading of the work piece.

The cutting insert 13 or 14 has four corners and a positive geometrical basic shape. The cutting insert also has a planar rake face, but may alternatively be formed with chip breakers of some sort. The tool shall not be rotated when performing longitudinal turning or facing such as shown, for example in FIGS. 4 and 5A, while the cutting insert 14 or 13 cuts the work piece 34. The threading insert 15 is triangular and has at least one cutting corner provided with a cutting edge for threading, for example such as described in U.S. Pat. No. 6,138,540 (FIG. 7). The grooving insert 16 has a rectangular shape with at least one projecting portion in order to cut a groove 35 in the work piece 34 (FIG. 6).

The positions of the milling inserts are determined so that during all turning operations, the milling inserts avoid contact with the work piece 34, i.e., they are passive. The first cutting inserts 12A–12D are consequently provided for milling of the work piece during rotation of the cutting tool around the center axis CL. The second cutting inserts 13–16 are provided for turning of the work piece 34 while the cutting tool is held stationary. The second cutting inserts 13–16 are arranged to be passive during milling of the work piece, and the first cutting inserts 12A–12D are provided to be passive during turning of the work piece.

The insert pockets 38 for the cutting inserts 36A, 36B and 36C are provided around a central through-hole 37 in the cutting tool 10 for the external threading of a rod type of workpiece (not shown) that extends through the hole 37. That hole 37 thus defines an inner periphery of the holder body. The threading inserts 36A–C are described more closely in Publication WO01/00362 which is hereby incorporated by reference in the present description as regards the cutting insert. Each of the cutting inserts 36A–C has a generally parallel epipedical basic shape and has a chip removing part as well as a securing portion. The thread milling inserts 36A–C are preferably made from cemented carbide. The chip removing part is equipped with two cutting edges, each of which consists of a number of teeth. This enables the threading inserts 36A–C to be indexable, i.e. both cutting edges can be utilized in the cutting tool 10 according to the present invention. A positive rake face is formed on the cutting inserts 36A–36C inside of, and in connection with, the respective cutting edge. From FIGS. 1A–1C it is apparent that each threading insert 36A, 36B, 36C is secured in an elongated cutting insert pocket 38 in the tool 10 by three screws received in threaded bores 39, which screws extend through holes formed in each cutting insert and are received in the bores 39 in the head 31. The screws 38 are controlled radially from the outside with a key, not shown. The cutting inserts 36A–C are intended to mill during circular interpolation. The axially foremost parts of the cutting inserts 36A–C are situated axially inside of the plane P. The cutting inserts 36A–C are situated radially inside of the circles C and C1.

In the present state of the art concerning numerical controlled lathes with milling spindles, the invention tool may work while rotating or while stationary, while having a very high positioning accuracy. Also, a tool according to the present invention having multi-functional machining properties can perform more machining operations with a minimum of "chip to chip" time. The tool functions in principle as a tool revolver with the difference being that it always sits in the active working spindle, and the time for changing tools can thereby almost entirely be eliminated. The tool can turn, mill, thread, drill, ream, form etc. depending on design. In addition to productivity increases, the tool constitutes an inexpensive way to provide the machine with a greater number of cutting inserts during, for example, unmanned operation.

An important advantage with the inventive tool is that the cutting inserts are positioned in such a way that milling, turn-milling, shape-milling, reaming and longitudinal turning, facing, shape turning, chamfering and threading can be performed with one and the same tool, depending only on the positioning and motion of the working spindle.

The tool can likewise have the shape of a grooving milling cutter or a disc-milling cutter.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. Cutting tool for chip removing machining, comprising:
a holder defining a center axis and including a forwardmost front end surface oriented substantially perpendicular to the center axis, the front end surface having a plurality of forwardly open insert pockets formed therein;
at least two first cutting inserts mounted in respective ones of the pockets and configured for performing a first type of machining operation, wherein radially outermost cutting edge portions of the first cutting inserts lie substantially on an imaginary circle; and
at least one second cutting insert mounted in one of the pockets on the holder and configured for performing a second type of machining operation different from the first type, the at least one second cutting insert being shaped differently from the first cutting insert and including a cutting edge the entirety of which being spaced radially inwardly from the imaginary circle.

2. The cutting tool according to claim 1, wherein the first inserts comprise milling inserts and are arranged to be passive during cutting of a workpiece by said at least one second cutting insert; said at least one second cutting insert arranged to be passive during milling of a workpiece by said first cutting inserts.

3. The cutting tool according to claim 2 wherein the at least one second cutting insert comprises one of: a longitudinal turning insert, a grooving insert, a thread turning insert, a copy turning insert, a facing insert, a thread milling insert, and an internal machining insert.

4. The cutting tool according to claim 2 wherein one of the first cutting inserts and the at least one second cutting insert communicate with a common chip space formed in the holder.

5. The cutting tool according to claim 1 wherein the first cutting inserts comprise milling inserts for cutting a workpiece in response to rotation of the holder about the axis; the at least one second cutting insert comprising a turning insert for cutting a workpiece as the holder remains stationary.

6. The cutting tool according to claim 1 further including third cutting inserts configured for thread milling and arranged around a center hole formed in the holder.

7. A holder for a chip removing machining tool, comprising a body defining a center axis and having a plurality of first insert pockets positioned such that radially outermost portions of the first insert pockets lie on an imaginary circle, and at least one second pocket spaced radially inside of the imaginary circle.

8. The holder according to claim 7 wherein one of the first pockets and the at least one second pocket communicate with a common chip space formed in the body.

9. The holder according to claim 7 wherein the body has a center hole and the at least one second pocket comprises a plurality of second pockets at least one of which is disposed at the center hole.

10. A holder for a chip removing machining tool, comprising a body having a center axis and a center hole formed therethrough along the center axis, the center hole defining an inner periphery of the holder, a first plurality of insert pockets formed around an outer periphery of the holder, and a second plurality of insert pockets formed around the inner periphery of the holder.

11. A method of machining a workpiece comprising the steps of:
A) positioning, adjacent the workpiece, a cutting tool comprising a holder defining a center axis and having a plurality of first cutting inserts and at least one second cutting insert disposed thereon, the first cutting inserts being configured differently from the at least one second cutting insert;
B) rotating the holder about the axis to perform a first chip forming machining operation on the workpiece by all of the first cutting inserts, while the at least one second cutting insert remains passive during rotation of the holder; and C) performing a different chip-forming machining operation on the workpiece by the at least one second cutting insert while the first cutting inserts remain passive.

12. The method according to claim 11 wherein the chip-forming machining operation performed by the first cutting insert is a milling operation, and the different machining operation performed at least one second cutting insert is a turning operation.

13. The method according to claim 11 wherein step B is performed prior to step C.

14. The method according to claim 11 wherein the tool of step A includes a center hole extending along the center axis and defining an inner periphery of the holder; the first cutting inserts disposed at an outer periphery of the holder; the at least one second cutting insert being disposed at the inner periphery; the workpiece extending within the center hole during step B.

15. Cutting tool for chip removing machining, comprising:

a holder defining a center axis and having a plurality of insert pockets formed therein;

at least two first cutting inserts mounted in respective ones of the pockets and configured for performing a first type of machining operation, wherein radially outer-most portions of the first cutting inserts lie substantially on an imaginary circle; and at least one second cutting insert mounted on the holder and configured for performing a second type of machining operation different from the first type, the at least one second cutting insert spaced radially inwardly from the imaginary circle;

wherein the first cutting inserts comprise milling inserts for cutting a workpiece in response to rotation of the holder about the axis; the at least one second cutting edge comprising a turning insert for cutting a workpiece as the holder remains stationary.

16. A method of machining a workpiece comprising the steps of:

A) positioning, adjacent the workpiece, a cutting tool comprising a holder defining a center axis and having a plurality of first cutting inserts and at least one second cutting insert disposed thereon, the first cutting inserts being configured differently from the at least one second cutting insert;

B) performing a first chip forming machining operation on the workpiece by the first cutting inserts, while the at least one second cutting insert remains passive; and C) performing a different chip-forming machining operation on the workpiece by the at least one second cutting insert while the first cutting inserts remain passive;

D) wherein the first chip-forming and machining operation performed by the first cutting inserts is a milling operation, and the different chip-forming machining operation performed by the at least one second cutting insert is a turning operation.

17. A method of machining a workpiece comprising the steps of:

A) positioning, adjacent the workpiece, a cutting tool comprising a holder defining a center axis and having a plurality of first cutting inserts and at least one second cutting insert disposed thereon, the first cutting inserts being configured differently from the at least one second cutting insert;

B) performing a first chip forming machining operation on the workpiece by the first cutting inserts, while the at least one second cutting insert remains passive; and C) performing a different chip-forming machining operation on the workpiece by the at least one second cutting insert while the first cutting inserts remain passive;

D) wherein the tool of step A includes a center hole extending along the center axis and defining an inner periphery of the holder; the first cutting inserts disposed at an outer periphery of the holder; the at least one second cutting insert being disposed at the inner periphery; the workpiece extending within the center hole during step B.

18. Cutting tool for chip removing machining, comprising:

a holder defining a center axis and having a plurality of insert pockets formed therein;

at least two first cutting inserts mounted in respective ones of the pockets and configured for performing a first type of machining operation, wherein radially outer-most portions of the first cutting inserts lie substantially on an imaginary circle; and at least one second cutting insert mounted on the holder and configured for performing a second type of machining operation different from the first type, the at least one second cutting insert spaced radially inwardly from the imaginary circle;

wherein a front surface of one of the first cutting inserts faces a front surface of the at least one second cutting insert and communicates with a common chip space formed in the holder.

* * * * *